United States Patent
Nakamura et al.

(10) Patent No.: US 11,693,118 B1
(45) Date of Patent: Jul. 4, 2023

(54) TECHNIQUES FOR IMPROVING PROBABILITY OF DETECTION IN LIGHT DETECTION AND RANGING (LIDAR) SYSTEMS

(71) Applicant: Aeva, Inc., Mountain View, CA (US)

(72) Inventors: James Nakamura, Chicago, IL (US); Krishna Toshniwal, Mountain View, CA (US); Jose Krause Perin, Mountain View, CA (US); Kumar Bhargav Viswanatha, Santa Clara, CA (US)

(73) Assignee: Aeva, Inc., Mountain View, CA (US)

( * ) Notice: Subject to any disclaimer, the term of this patent is extended or adjusted under 35 U.S.C. 154(b) by 0 days.

(21) Appl. No.: 17/944,700

(22) Filed: Sep. 14, 2022

(51) Int. Cl.
  *G01S 17/89* (2020.01)
  *G01S 17/58* (2006.01)

(52) U.S. Cl.
  CPC .............. *G01S 17/89* (2013.01); *G01S 17/58* (2013.01)

(58) Field of Classification Search
  CPC .................................. G01S 17/58; G01S 17/89
  See application file for complete search history.

(56) References Cited

U.S. PATENT DOCUMENTS 11,307,295 B1 * 4/2022 Toshniwal ............ G01S 7/4912
11,313,955 B1 * 4/2022 Viswanatha ............ G01S 7/493

* cited by examiner

Primary Examiner — Bryan Bui
(74) Attorney, Agent, or Firm — Womble Bond Dickinson (US) LLP

(57) ABSTRACT

A light detection and ranging (LIDAR) technique that includes dividing the field of view into a grid including a plurality of cells. The technique also includes generating a baseband signal based on a returned optical beam. The baseband signal includes a plurality of peaks corresponding with up-chirps and down-chirps in the transmitted signal. A plurality of points are computed based on the peaks. Each point includes information describing a range and a velocity and corresponds to a respective cell. A point confidence score is computed for each point, and a cell confidence score is computed for each cell based on the point confidence scores of the points within the cell. Each point can be accepted or rejected for inclusion in a point cloud based on the point confidence score for the point and the cell confidence scores for the plurality of cells.

20 Claims, 12 Drawing Sheets

US 11,693,118 B1

TECHNIQUES FOR IMPROVING PROBABILITY OF DETECTION IN LIGHT DETECTION AND RANGING (LIDAR) SYSTEMS

TECHNICAL FIELD

The present disclosure relates generally to point cloud filtering techniques and, more particularly, point cloud filtering techniques for use in a light detection and ranging (LIDAR) system.

BACKGROUND

Frequency-Modulated Continuous-Wave (FMCW) LIDAR systems include several possible phase impairments such as laser phase noise, circuitry phase noise, flicker noise that the driving electronics inject on a laser, drift over temperature, and chirp rate offsets. FMCW LiDAR point clouds may exhibit distinct noise patterns, which may arise from incorrect peak matching leading to falsely detected points that appear in the scene even when nothing is present. For example, when an FMCW LiDAR points to a fence or a bush, a number of ghost points may appear in the scene between the LiDAR and the fence. These ghost points, also known as false detections, if left unfiltered, may introduce ghost objects and cause errors in the estimated target range and/or velocity.

BRIEF DESCRIPTION OF THE DRAWINGS

For a more complete understanding of the various examples, reference is now made to the following detailed description taken in connection with the accompanying drawings in which like identifiers correspond to like elements.

DETAILED DESCRIPTION

Figure 1A:
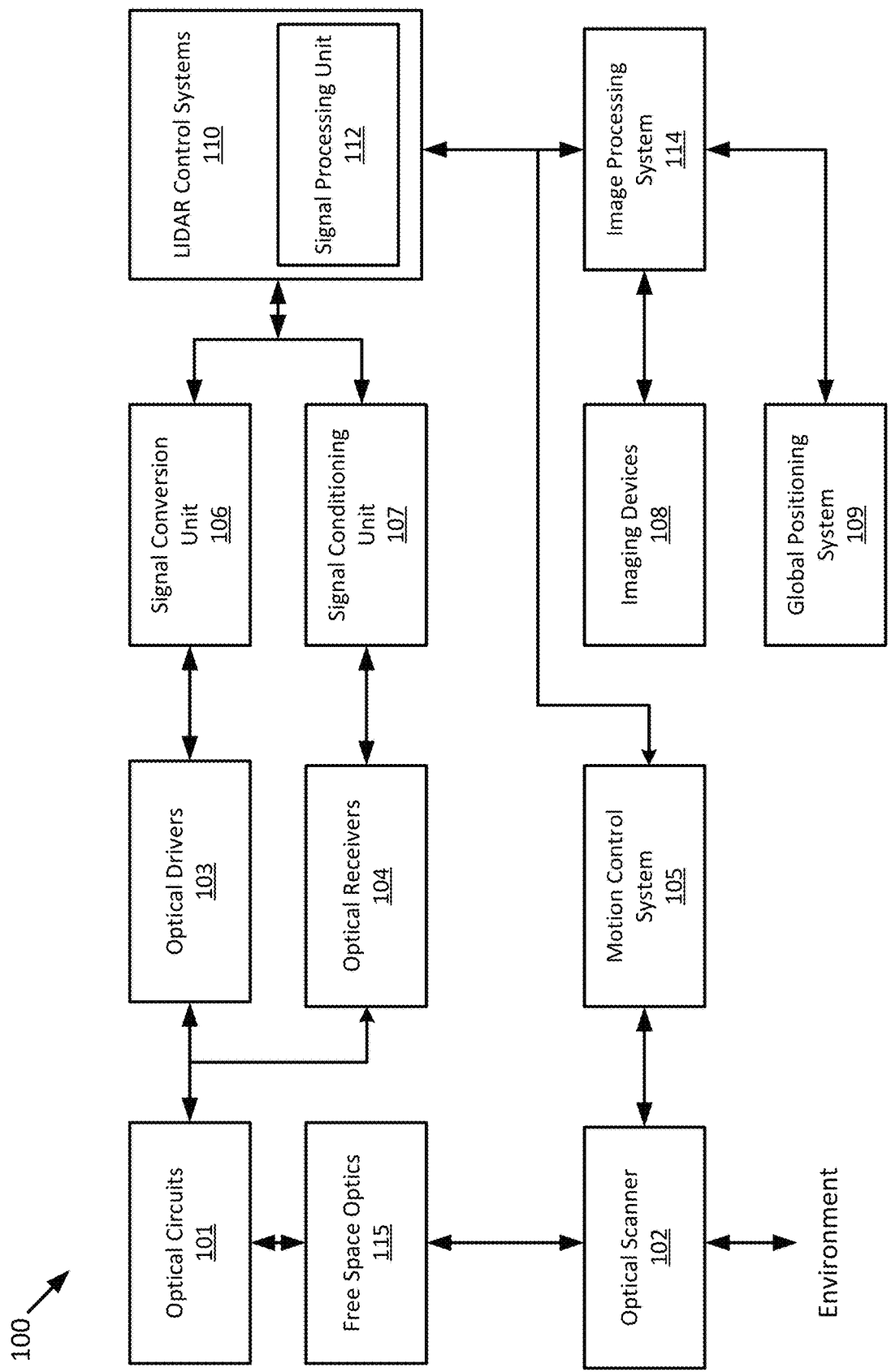
FIG. 1A is a block diagram of an example LIDAR system according to embodiments of the present disclosure.

The present disclosure describes various examples of LIDAR systems and methods for detecting distance and relative speed of objects. More specifically, the present disclosure describes improved techniques for filtering a point cloud in LIDAR systems.

The present disclosure describes various examples of LIDAR systems and methods for automatically mitigating ghosting that may occur due to noise, interference, aliasing, and other sources of error. According to some embodiments, the described LIDAR system may be implemented in any sensing market, such as, but not limited to, transportation, manufacturing, metrology, medical, virtual reality, augmented reality, and security systems. According to some embodiments, the described LIDAR system is implemented as part of a front-end of frequency modulated continuous-wave (FMCW) device that assists with spatial awareness for automated driver assist systems, or self-driving vehicles.

LIDAR systems described by the embodiments herein include coherent scan technology to detect a signal returned from a target to generate a coherent heterodyne signal, from which range and velocity information of the target may be extracted. A signal, or multiple signals, may include an up-sweep of frequency (up-chirp) and a down-sweep of frequency (down-chirp), either from a single optical source or from separate optical sources (i.e., one source with an up-sweep and one source with a down-sweep). Accordingly, two different frequency peaks, one for the up-chirp and one for the down-chirp, may be associated with a target and can be used to determine a target's range and velocity.

However, in some cases, multiple peaks may appear in the signal for various possible reasons related to noise and the like. Additionally, peak images may also occur when the LIDAR system processes the signals due to negative frequency aliasing, for example. If the wrong peak is used to detect a target, this may cause the LIDAR system to detect a target in a location where there is no target. Accordingly, some points added to the point cloud may be false detections, i.e., ghosting. Using the techniques described herein, embodiments of the present disclosure can filter the point cloud to eliminate false detections, thereby improving the reliability of the point cloud information.

Aspects of the present disclosure address the above-noted and other deficiencies by using point metrics and point clustering to improve the probability of detection in a LIDAR system.

In some embodiments of the present techniques, the field of view of the LIDAR system is divided into a grid with a plurality of cells. An optical beam with an up-chirp and a down-chirp is transmitted and a return optical beam is received from one or more objects in the field of view. A baseband signal can be generated based on the returned optical beam. The baseband signal can include a plurality of peaks corresponding with the at least one up-chirp and the at least one down-chirp. Points may be generated for each of the detected peaks, such that each point includes information describing a variety of characteristics associated with the point such as range, velocity, intensity (brightness), location, and others. The location of the points can be used to identify a corresponding cell into which the point falls. Additionally, a point confidence score can be computed for each point based on intensity and/or other factors. Cell confidence scores can be computed for each cell based on the point confidence scores of the points within the cell.

The point confidence scores and cell confidence scores may then be used to filter the point cloud, i.e., determine which points to reject (e.g., remove from the point cloud) and which points to accept (e.g., add to the point cloud). A number of possible strategies for filtering the point cloud based on the point confidence scores and the cell confidence scores may be used. For example, if the point confidence score for a particular point is above a specified threshold, the point may be classified as a high confidence point, whereas if the point score for a particular point is below a specified threshold, the point may be classified as a low confidence point. Cells may also be classified as high confidence or low confidence in the same manner, i.e., comparing the cell confidence score to one or more thresholds. In some embodiments, high confidence points may be accepted, while low confidence points may be accepted if they are located in a high confidence cell or rejected if they are located in a low confidence cell. Other techniques may also be used, some of which are described below.

The disclosed techniques may also be useful for eliminating points that are the result of negative frequency aliasing. In real sampling, all frequency peaks will be detected as having a positive frequency. Thus, if the doppler shift experienced by the down chirp causes the frequency to be negative, the peak will still be detected as positive, resulting in negative frequency aliasing. For this reason, a peak detected close to zero hertz will have an increased possibility of being a peak image (reflected across the origin), as opposed to a true peak. The present techniques can be used to distinguish between points resulting from a true peak and points resulting from a peak image due to negative frequency aliasing.

In the following description, reference may be made herein to quantitative measures, values, relationships or the like. Unless otherwise stated, any one or more if not all of these may be absolute or approximate to account for acceptable variations that may occur, such as those due to engineering tolerances or the like. These values may also be scaled or shifted depending on the Lidar parameters. Any quantitative measures are examples to demonstrate relationships rather than requirements of the invention.

FIG. 1A is a block diagram of an example LIDAR system 100 according to example implementations of the present disclosure. The LIDAR system 100 includes one or more of each of a number of components but may include fewer or additional components than shown in FIG. 1. As shown, the LIDAR system 100 includes optical circuits 101 implemented on a photonics chip. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LIDAR control systems 110 may include a signal processing unit 112 such as a DSP. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long-range measurements of range, velocity, azimuth, and elevation of the surrounding environment.

In some examples, the scanning process begins with the optical drivers 103 and LIDAR control systems 110. The LIDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal.

Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LIDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 1B:
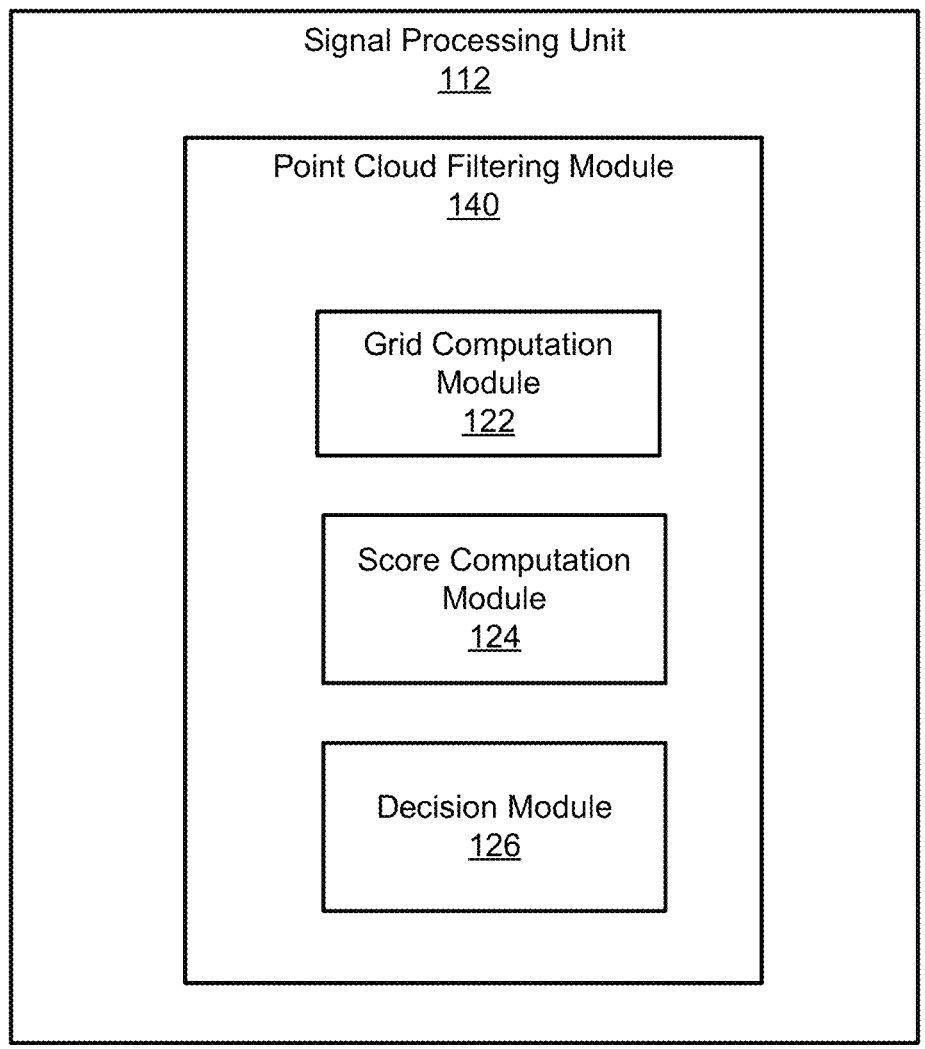
FIG. 1B is a block diagram illustrating an example of a point cloud filtering module in a LIDAR system according to embodiments of the present disclosure

FIG. 1B is a block diagram 100B illustrating an example of a point cloud filtering module 140 in a LIDAR system according to embodiments of the present disclosure. The point cloud filtering module 140 may be included in the signal processing unit 112. However, embodiments of the present disclosure are not limited as such. For example, in some embodiments, the point cloud filtering module 140 and/or any of its constituent components therein may reside in computer memory (e.g., RAM, ROM, flash memory, and the like) resident on the LIDAR control system 110.

With reference to FIG. 1B, the point cloud filtering module 140 includes the functionality to score points and cells and make determinations about the acceptance or rejection of points with respect to the point cloud. The point cloud filtering module 140 may be used to process an existing point cloud or may be used to generate the point cloud. In other words, accepting a point for inclusion in the point cloud may include adding the point to the point cloud or leaving the point in the point cloud. Similarly, rejecting a point for inclusion in the point cloud may include removing the point from the point cloud or making a decision not to add the point to the point cloud. In some embodiments, removing the point from the point cloud may involve flagging the point such the point is not used in the downstream computations even though the point's data is still in memory.

The point cloud filtering process disclosed herein involves making decisions about whether to reject certain points based on the qualities of nearby points that are considered to have a high probability of being valid. In other words, points that have a lower certainty can be accepted or rejected based on other points in a same neighborhood. Point neighborhoods may be determined in a variety of ways, such as through clustering and data binning, for example. Embodiments of the present disclosure determine cell neighborhoods by segmenting the field of view into a grid with a plurality of cells. However, other techniques are also possible.

According to some embodiments, the point cloud filtering module 140 can include a grid computation module 122, score computation module 124, and decision module 126. The grid computation module 122 includes the functionality to compute a grid of cells for storage in computer memory resident in LIDAR system 100. The computed grid may store in any suitable type of data structure that clusters points into a neighborhood, including a k-dimensional tree (k-d Tree) or an octree grid, for example. In these examples, the clusters can be formed using any metric or combination of metrics of the point itself, including, but not limited to, frequency, range, velocity, intensity or related metrics. A simple nearness metric is Euclidean distance—the distance between two points. The coordinates of the grid may be in the range-azimuth space, range-azimuth-elevation space, X-Y space, or the X-Y-Z space depending on the implementation details of a specific embodiment. In some embodiments, the grid may also be non-linear, meaning the step size (i.e., size of the cells) can change according to the cell location. Grids computed by grid computation module 122 can divide the field of view of the LIDAR system 100 into a plurality of adjacent cells also referred herein to as "neighborhoods." The size and number of cells may be determined at least in part based on the FFT size and the sampling rate. Additionally, the size and number of cells may be affected by whether a target is static or dynamic. For example, the cells may be scaled based on the range, azimuth, ego velocity (e.g., velocity of the vehicle), and other factors.

The score computation module 124 includes the functionality to compute one or more metrics for the points and the cells. The metric may include a point confidence score that describes the degree to which a particular point is considered to be a true detection. The point confidence score may be a score on scale from 0 to 100, for example. The point confidence score may be determined based on a number of factors including, but not limited to, intensity, signal-to-noise ratio (SNR), and reflectivity. The point confidence score may also be determined based, in part, on scan region (e.g., azimuth, elevation), and target location, (e.g., range, velocity). For example, there may be more noise in certain regions that may cause the confidence scores to be reduced for points in that region. The point confidence may also be affected by any number of known system parameters, like chirp rate, reference arm length, or amplifier power. The point confidence score may also be determined based, in part, the up sweep (up-chirp) frequency, and/or down sweep (down-chirp frequency) of the related peaks. For example, if the down-chirp frequency is close to zero (within a specified threshold), the point confidence score may be reduced to reflect the possibility that the point may be an alias. The point confidence scores can also be affected by the similarity to other nearby points that are close in range velocity, intensity, azimuth, or elevation, for example. Any combination of factors described above may be used to compute the point confidence score.

The score computation module 124 also includes the functionality to compute cell confidence scores and other metrics for each of the cells. The metrics for each cell are based on the metrics of the points located within the cell. For example, the cell confidence score for a particular cell may be computed as the average of the point confidence scores for the points located in the cell, and the average velocity of the cell can be computed as the average velocity of the points within the cell. Various additional metrics may be calculated such as the minimum point confidence score, maximum point confidence score, point score variance, minimum point velocity, maximum point velocity, point velocity variance, and others. It should be noted that embodiments of the present disclosure are not limited to the techniques described herein, and may include other neighboring and/or point clustering techniques.

In some embodiments, the score computation module 124 is also configured to classify points and cells as high confidence or low confidence based on the confidence scores. For example, a point may be classified as a "high confidence" point if the point confidence score of the point is above a first threshold, or as a "low confidence" point if the point confidence score of the point is below a second threshold. In some embodiments, the first and second thresholds are the same, and each point is classified as either high confidence or low confidence. In some embodiments, the first and second thresholds are different, which may allow some points to be labeled neither high confidence nor low confidence. In the same or similar manner, cells may be labeled as high confidence or low confidence by comparing the cell confidence score to one or more thresholds.

It should be noted that the terms "high confidence" and "low confidence" as used herein should not be limited in scope and can be applied to points or cells based on a comparison of the relevant confidence score to a corresponding threshold. Furthermore, flagging a point or cell with a "high confidence" label or "low confidence" label may be accomplished in any number of ways including, but not limited to, controlling the value of one or more bits associated with the point in a point cloud data structure.

The decision module 126 includes the functionality to determine, based on a particular metric or combination of metrics, whether to accept or reject specific points for inclusion in the point cloud. Examples of some point filtering techniques are described below in relation to FIGS. 5-10.

Figure 2:
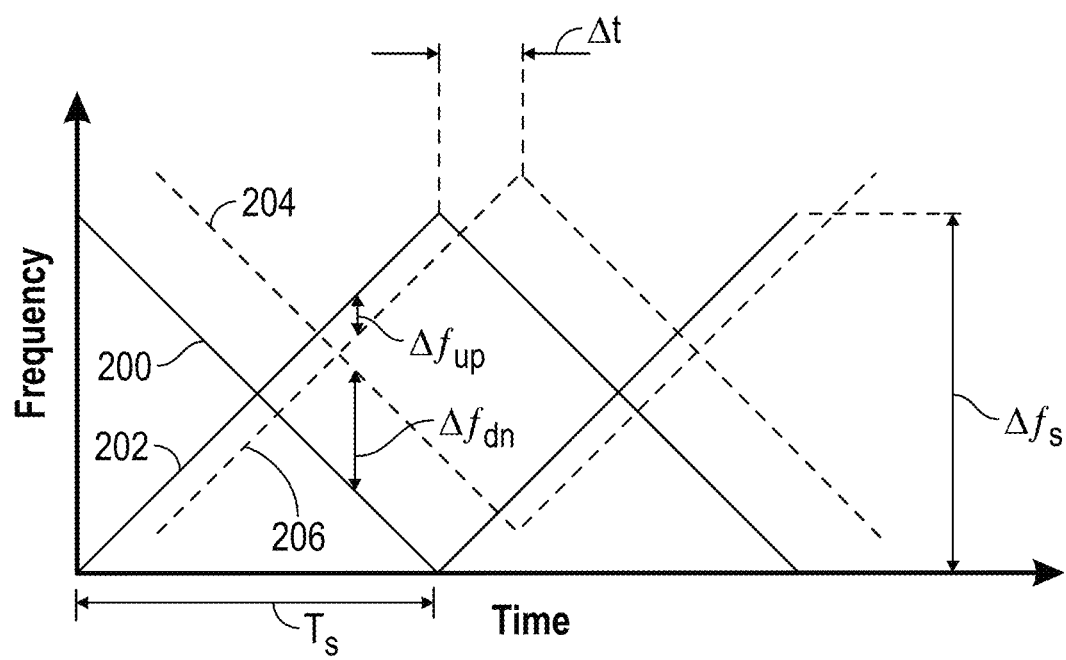
FIG. 2 is a time-frequency diagram of FMCW scanning signals that can be used by a LIDAR system according to some embodiments.

FIG. 2 is a time-frequency diagram of FMCW scanning signals that can be used by a LIDAR system according to some embodiments. The FMCW scanning signals 200 and 202 may be used in any suitable LIDAR system, including the system 100, to scan a target environment.

The scanning signal 200 may be a triangular waveform with an up-chirp and a down-chirp having a same bandwidth $\Delta f_s$ and period $T_s$. The other scanning signal 202 is also a triangular waveform that includes an up-chirp and a down-chirp with bandwidth $\Delta f_s$ and period $T_s$. However, the two signals are inverted versions of one another such that the up-chirp on scanning signal 200 occurs in unison with the down-chirp on scanning signal 202.

FIG. 2 also depicts example return signals 204 and 206. The return signals 204 and 206, are time-delayed versions of the scanning signals 200 and 202, where Δt is the round-trip time to and from a target illuminated by scanning signal 201. The round-trip time is given as Δt=2R/v, where R is the target range and v is the velocity of the optical beam, which is the speed of light c. The target range, R, can therefore be calculated as R=c(Δt/2).

In embodiments, the time delay Δt is not measured directly but is inferred based on the frequency differences between the outgoing scanning waveforms and the return signals. When the return signals 204 and 206 are optically mixed with the corresponding scanning signals, a signal referred to as a "beat frequency" is generated, which is caused by the combination of two waveforms of similar but slightly different frequencies. The beat frequency indicates the frequency difference between the outgoing scanning waveform and the return signal, which is linearly related to the time delay Δt by the slope of the triangular waveform.

If the return signal has been reflected from an object in motion, the frequency of the return signal will also be affected by the Doppler effect, which is shown in FIG. 2 as an upward shift of the return signals 204 and 206. Using an up-chirp and a down-chirp enables the generation of two beat frequencies, $\Delta f_{up}$ and $\Delta f_{dn}$ (also referred to herein more simply as $f_{up}$ and $f_{dn}$). The beat frequencies $\Delta f_{up}$ and $\Delta f_{dn}$ are related to the frequency difference cause by the range, $\Delta f_{Range}$, and the frequency difference cause by the Doppler shift, $\Delta f_{Doppler}$, according to the following formulas:

$$\Delta f_{up} = \Delta f_{Range} - \Delta f_{Doppler} \qquad \text{Eq. 1}$$

$$\Delta f_{dn} = \Delta f_{Range} + \Delta f_{Doppler} \qquad \text{Eq. 2}$$

Thus, the beat frequencies $\Delta f_{up}$ and $\Delta f_{du}$ can be used to differentiate between frequency shifts caused by the range and frequency shifts caused by motion of the measured object. Specifically, $\Delta f_{Doppler}$ is the difference between the $\Delta f_{up}$ and $\Delta f_{du}$ and the $\Delta f_{Range}$ is the average of $\Delta f_{up}$ and $\Delta f_{dn}$.

The range to the target and velocity of the target can be computed using the following formulas:

$$\text{Range} = \Delta f_{Range} \frac{cT_s}{2\Delta f_s} \qquad \text{Eq. 3}$$

$$\text{Velocity} = \Delta f_{Doppler} \frac{\lambda_c}{2} \qquad \text{Eq. 4}$$

In the above formulas, $\lambda_c = c/f_c$ and $f_c$ is the center frequency of the scanning signal. Equations (3) and (4) can be also be expressed as follows:

$$\text{Range} = \alpha \cdot (f_{up} + f_{dn}) \qquad \text{Eq. 5}$$

$$\text{Where, } \alpha = \frac{cT_s}{4\Delta f_s}$$

$$\text{Velocity} = \beta \cdot (f_{up} - f_{dn}) \qquad \text{Eq. 6}$$

$$\text{Where, } \beta = \frac{\lambda_c}{2}$$

The beat frequencies can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100.

In some scenarios, to ensure that the beat frequencies accurately represent the range and velocity of the object, beat frequencies can be measured at the same moment in time, as shown in FIG. 2. Otherwise, if the up-chirp beat frequency and the down-chirp beat frequencies were measured at different times, quick changes in the velocity of the object could cause inaccurate results because the Doppler effect would not be the same for both beat frequencies, meaning that equations (1) and (2) above would no longer be valid. To measure both beat frequencies at the same time, the up-chirp and down-chirp can be synchronized and transmitted simultaneously using, for example, two signals that are multiplexed together.

Figure 3:
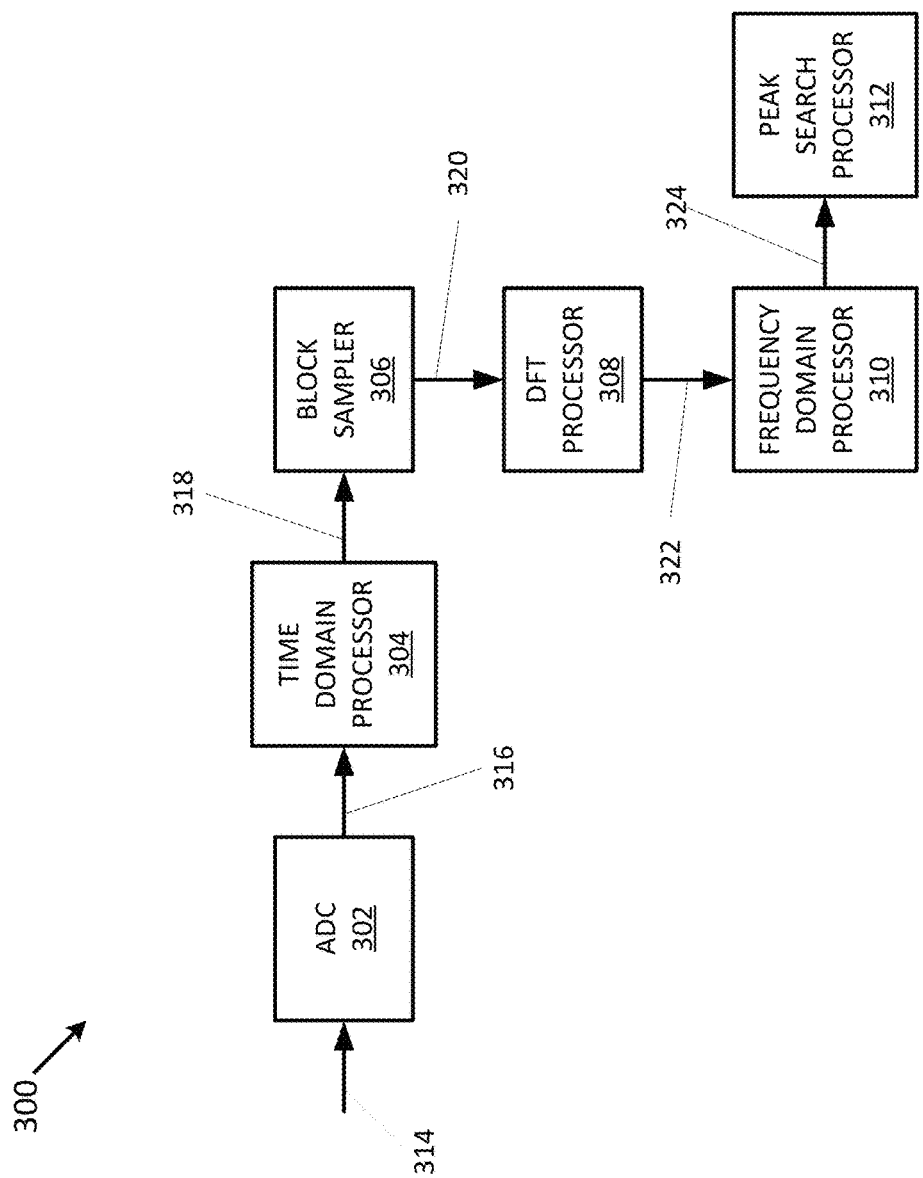
FIG. 3 is a block diagram of an example signal processing system, which processes the baseband signal according to some embodiments.

FIG. 3 a block diagram of an example signal processing system 300, which processes the baseband signal 314 according to some embodiments. The signal processing system 300 may include elements of signal conversion unit 106, signal conditioning unit 107, LIDAR control systems 110 and signal processing unit 112 in LIDAR system 100.

The signal processing system 300 includes an analog-to-digital converter (ADC) 302, a time domain signal processor 304, a block sampler 306, a discrete Fourier transform (DFT) processor 308, a frequency domain signal processor 310, and a peak search processor 312. The component blocks of signal processing system 300 may be implemented in hardware, firmware, software, or some combination of hardware, firmware and software.

In FIG. 3, the baseband signal 314, which is a continuous analog signal in the time domain, is sampled by ADC 302 to generate a series of time domain samples 316. The time domain samples 316 are processed by the time domain signal processor 304, which conditions the time domain samples 316 for further processing. For example, time domain signal processor 304 may apply weighting or filtering to remove unwanted signal artifacts or to render the signal more tractable for subsequent processing. The output 318 of time domain signal processor 304 is provided to the block sampler 306. The block sampler 306 groups the time domain samples 318 into groups of N samples 320 (where N is an integer greater than 1), which are provided to the DFT processor 308. The DFT processor 308 transforms the groups of N time domain samples 320 into N frequency bins or subbands 322 in the frequency domain, covering the bandwidth of the baseband signal 314. The N subbands 322 are provided to the frequency domain signal processor 310, which conditions the subbands for further processing. For example, frequency domain signal processor 310 may resample and/or average the subbands 322 for noise reduction. The frequency domain signal processor 310 may also calculate signal statistics and system noise statistics. The processed subbands 324 are then provided to the peak search processor 312 that searches for signal peaks representing detected targets in the FOV of the LIDAR system. An example representation of the detected signal peaks is shown below in relation to FIG. 4.

Figure 4:
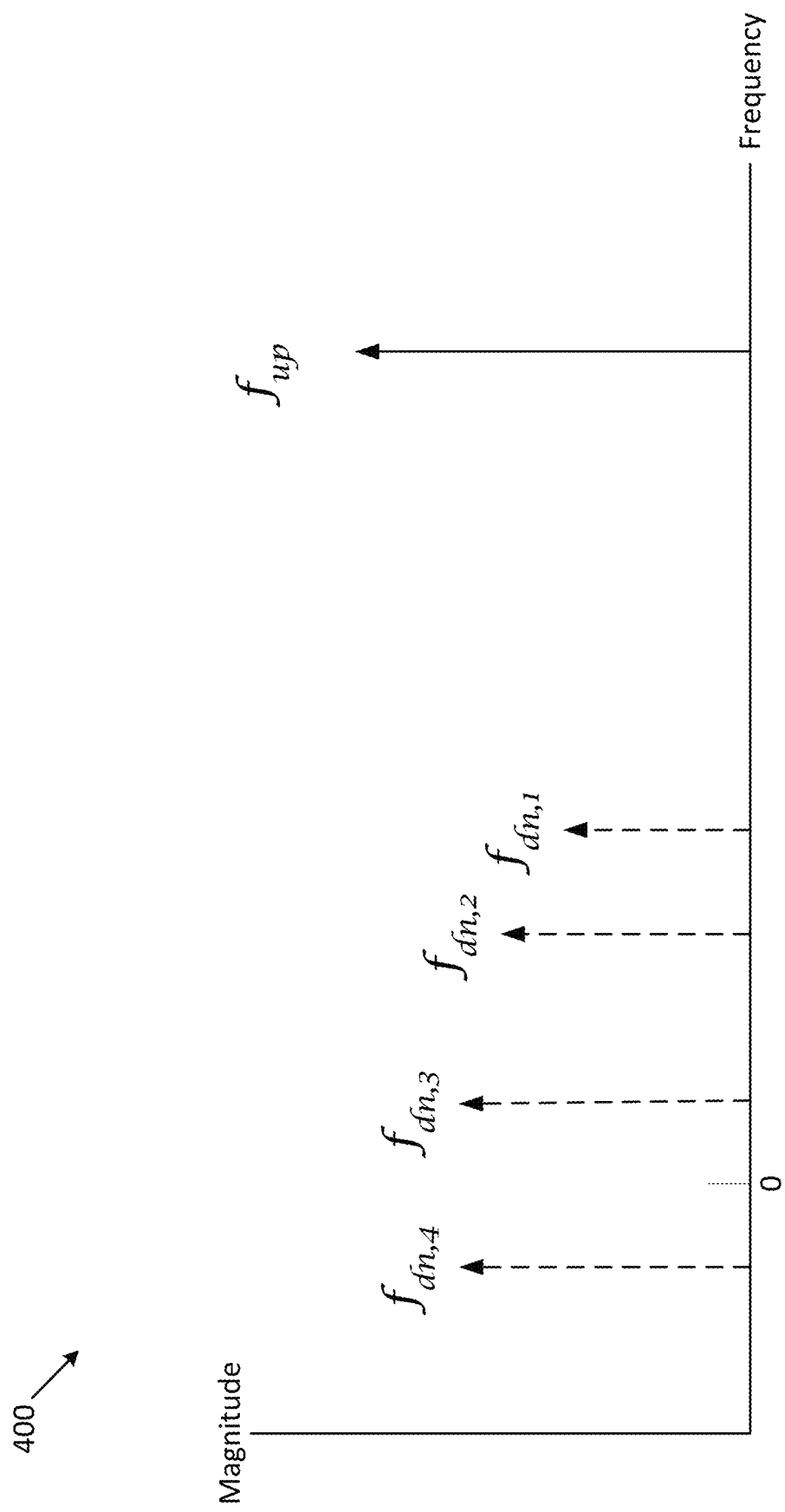
FIG. 4 is a graph of detected signal peaks detected from a baseband signal in accordance with some embodiments.

FIG. 4 is a graph of detected signal peaks detected from a baseband signal in accordance with some embodiments. The detected signal peaks may be detected, for example, by the peak search processor 312 (FIG. 3). In graph 400 of FIG. 4, the X-axis represents frequency, and the Y-axis represents the signal magnitude (also known as intensity). The frequency $f_{up}$ represents the beat frequency corresponding to an up-chirp (upshift beat frequency), and frequencies $f_{dn,1}$, $f_{dn,2}$, and $f_{dn,3}$ represent several beat frequencies that could be detected for the corresponding down-chirp (downshift beat frequencies). The other peaks may be the result of noise or negative frequency aliasing, for example. In this example, $f_{dn,3}$ is shown as a possible negative frequency alias of peak $f_{dn,4}$ (where $f_{dn,4} = -f_{dn,3}$). This may also be referred to as a dual target because only one of the downshift beat frequencies is a true peak. Selection of the incorrect peak will result in a false detection, i.e., a point that does not represent an actual target.

In accordance with some embodiments of the present techniques, a point may be computed for each of the detected peaks ($f_{dn,1}$, $f_{dn,2}$, and $f_{dn,3}$) and some or all of the corresponding negative peaks ($-f_{dn,1}$, $-f_{dn,2}$, and $-f_{dn,3}$), resulting in six possible points that can be considered for inclusion in the point cloud. Each of the points may be processed by the point cloud filtering module 140 of FIG. 1B.

Figure 5:
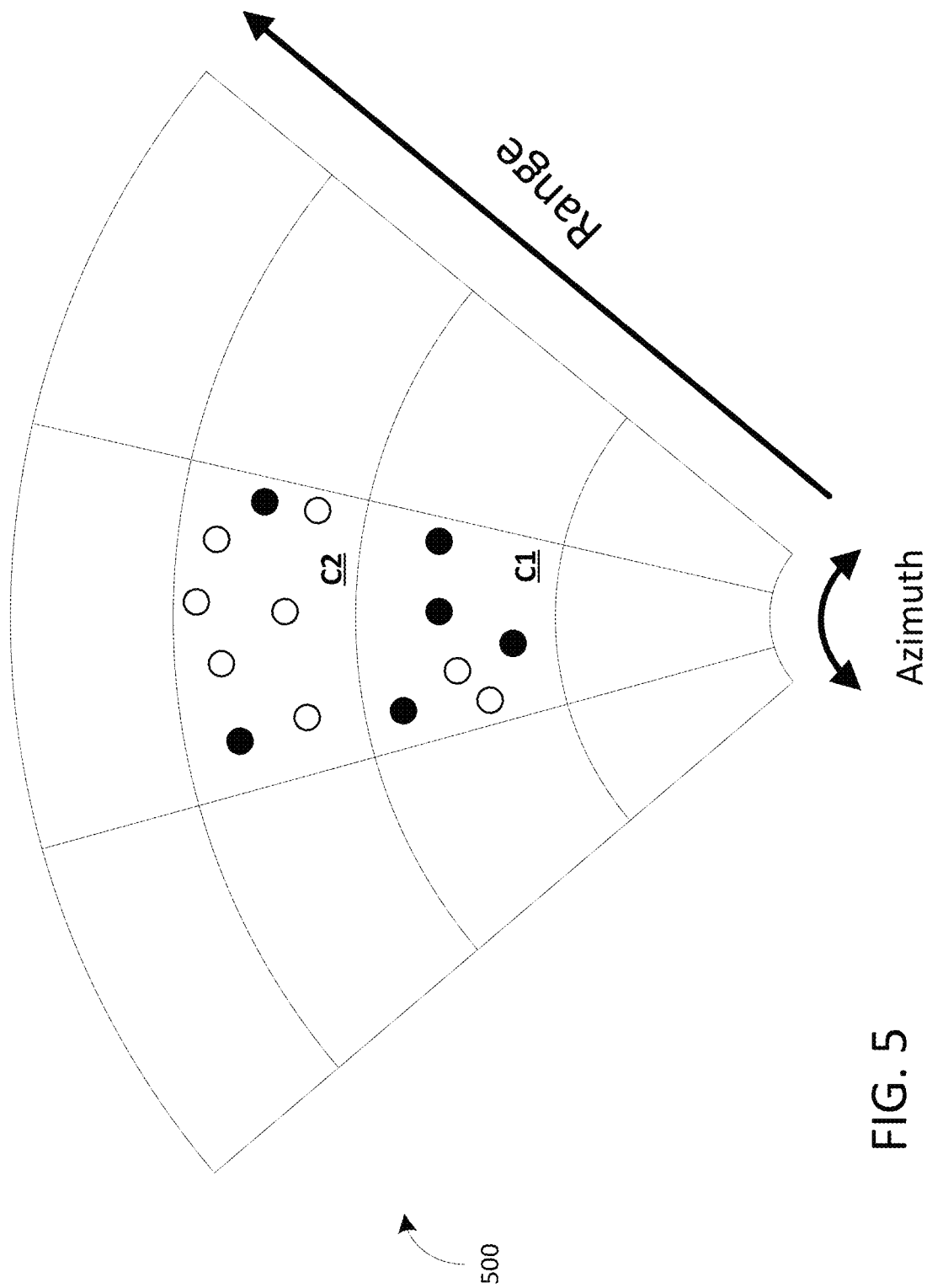
FIG. 5 is a diagram of a range-azimuth grid including a plurality of possible points to be included in the point cloud.

FIG. 5 is a diagram of a range-azimuth grid including a plurality of possible points to be included in the point cloud, as computed by the point cloud filtering module 140 according to embodiments of the present disclosure. The grid 500 shown in FIG. 5 is a range-azimuth grid and is non-linear such that the size of cells increases as the range increases. For example, the width of the cells may vary from about 0.3 meters at near ranges to about 1 to 2 meters at the outer ranges. Although the grid shown in FIG. 5 is a range-azimuth grid, it will be appreciated that the present techniques can be applied to any suitable style of grid, including range-azimuth-elevation, X-Y, X-Y-Z, and others. It will also be appreciated this implementation is not limited to a grid—any clustering or neighborhooding method can be used to group and filter points.

Several points are plotted within the grid, each of which may be associated with a range, velocity, intensity, and other information. Each point represents a potential point that may be included in the final point cloud. The points have been classified as high confidence points (white) and low confidence points (black). In some examples, high confidence points may be included in the point cloud, while the low confidence points may or may not be included in the point cloud depending on other factors such as the point velocity, the cell confidence scores, and the cell velocity scores. For example, in some embodiments, low confidence points may be included in the point cloud if they are located in a high confidence cell or may be excluded from the point cloud if they are in a low confidence cell. Applied to the points in FIG. 5, cell C1 would most likely be classified as a low confidence cell since the majority of points in C1 are low confidence points. Cell C2 would most likely be classified as a high confidence cell since the majority of points in C2 are high confidence points. Therefore, the low confidence points in C1 would be excluded, while the low confidence points in C2 would be included.

In some embodiments, points may be filtered by comparing the velocity of each point with the average velocity of the cell. If the point velocity is a match, i.e., within a specified threshold, the point may be included. Otherwise, the point may be excluded. This velocity comparison filtering may be performed for each point or for only low confidence points. Additionally, the velocity comparison may also be combined with the cell confidence or point information comparison. For example, the filtering algorithm may accept a low confidence point if it is in a high confidence cell and the velocity of the point is a close match for the cell velocity. Otherwise, the low confidence point may be rejected if the low confidence point is in a low confidence cell or the velocity of the point does not match the cell velocity. Many additional techniques and algorithms may be used in place of or in combination with the techniques described above.

Figure 6:
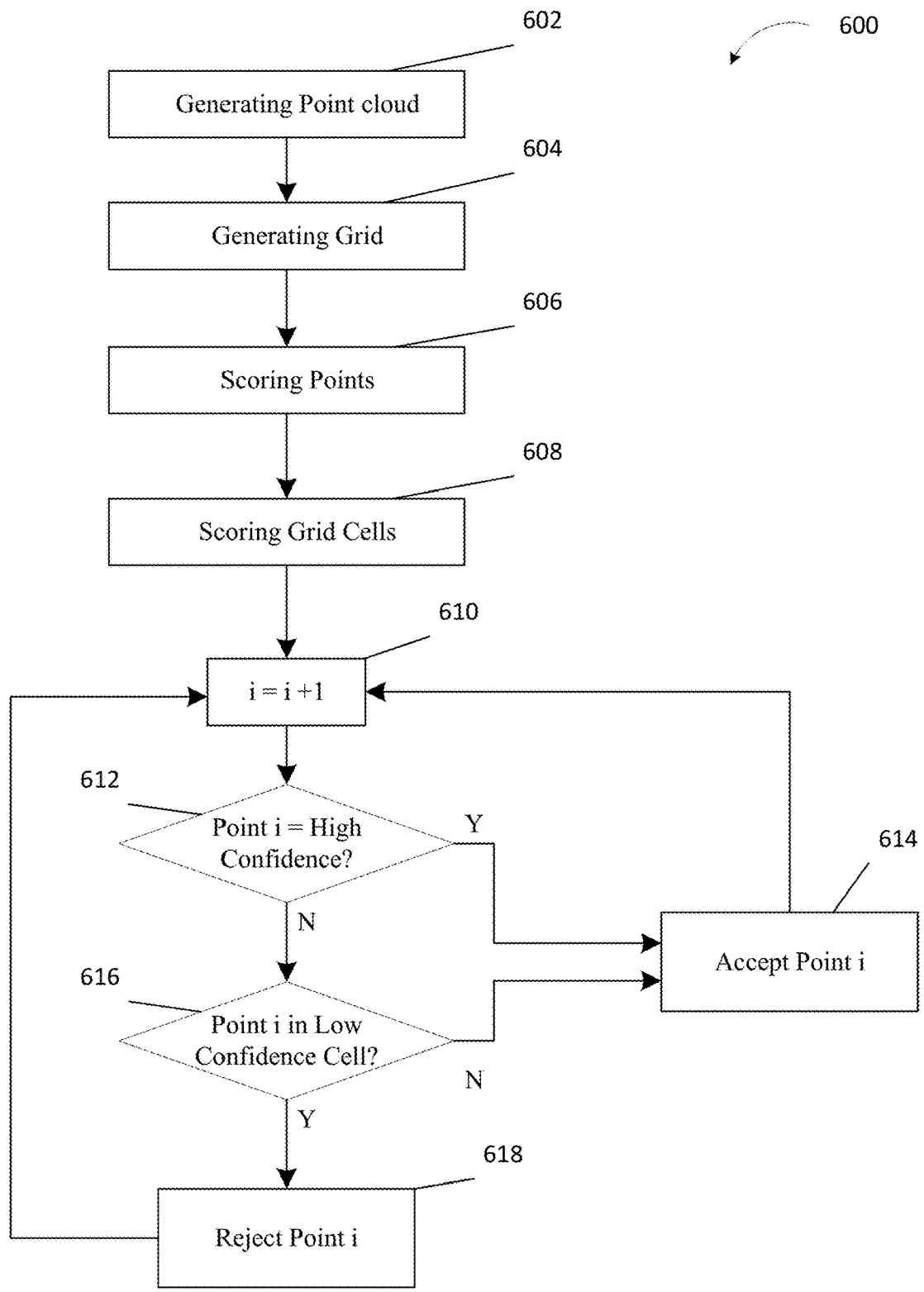
FIG. 6 is a process flow diagram of an example method of filtering a point cloud, according to an embodiment of the present disclosure.

FIG. 6 is a process flow diagram of an example method of filtering a point cloud, according to an embodiment of the present disclosure. The method 600 may be performed by any suitable LIDAR system, including the LIDAR system 100 described above. For example, the method may be performed by a point cloud filter module 140 as shown in FIG. 2. The method may begin at block 602.

At block 602, a point cloud is generated. The point cloud may be generated by the signal processing unit 112 (FIGS. 1 and 2) based on peaks detected by the peak search processor 312 (FIG. 3). At this stage, the point cloud is unfiltered and therefore includes all of the potential points that may be eventually accepted. The point cloud may be generated by generating points for each detected combination of frequency peaks, e.g., $f_{up}$ and $f_{dn,1}$, $f_{up}$ and $f_{dn,2}$, and $f_{up}$ and $f_{dn,3}$. Optionally, the point cloud may also include points for each mirror image of the downshift beat frequency, e.g., $f_{up}$ and $-f_{dn,1}$, $f_{up}$ and $-f_{dn,2}$, and $f_{up}$ and $-f_{dn,3}$. Each point is associated with a range, a velocity, and other potential information such as intensity, azimuth angle, elevation angle, and other point characteristics.

At block 604, a grid is computed. The grid segments the field of view into a plurality of adjacent cells. The grid may be computed statically or dynamically by the grid computation module 122 (FIG. 2) based on factors such as ego velocity. The grid divides the points into groupings of points, which may be referred to as cells. Each point is contained within one of the cells.

At block 606, the points are scored by the score computation module 124 (FIG. 2). Scoring the points may include generating a point confidence score for each point and using the confidence scores to classify the points as high confidence or low confidence. Various techniques may be used to score and/or classify the points. For example, if a particular sample of the baseband signal results in more than one potential point (i.e., more than one $-f_{dn,3}$) the resulting points may be identified as low confidence points. Additional points that may be classified as low confidence include points with an intensity and/or SNR below a specified threshold. Points that may be identified as high confidence include those points with an intensity and/or SNR above a specified threshold. Other metrics may also be considered. The point scoring and classification can also include a weighting of two or more metrics.

At block 608, the grid cells are scored by the score computation module 124 (FIG. 2). Scoring the cells may include generating a cell confidence score for each cell and using the cell confidence scores to classify the cells as high confidence or low confidence. Various techniques may be used to score and/or classify the cells. The cell score for each cell may be based on the confidence scores of the points within the cell or the classifications of the points within the cell. For example, a cell confidence score may be computed by averaging the point confidence scores for the points within the cell, and the cell confidence score can be compared to one or more thresholds to classify the cell as high confidence or low confidence. In another embodiment, a cell may be classified as high confidence if the majority of points in the cell are high confidence, or low confidence if the majority of points in the cell are low confidence. Other techniques are also possible.

Starting at block 610, each point may be evaluated to determine whether it will be accepted or rejected for inclusion in the point cloud. The evaluations described below may be processed by the decision module 126 (FIG. 2). At the first iteration of block 610, a counter, i, is set to an initial value (e.g., 0 or 1).

At block 612, a determination is made regarding whether the point is a high confidence point. If the point is a high confidence point, the process flow advances to block 614 and the point is accepted. Otherwise, the process flow advances to block 616.

At block 616, a determination is made regarding whether the point is in a high confidence cell. If the point is in a high confidence cell, the process flow advances to block 614 and the point is accepted. Otherwise, the process flow advances to block 618, and the point is rejected. The process flow then returns to block 610, the counter is incremented, and the next point is processed.

It will be appreciated that embodiments of the method 600 may include additional blocks not shown in FIG. 6 and that some of the blocks shown in FIG. 6 may be omitted. Additionally, the processes associated with blocks 602 through 618 may be performed in a different order than what is shown in FIG. 6.

Figure 7:
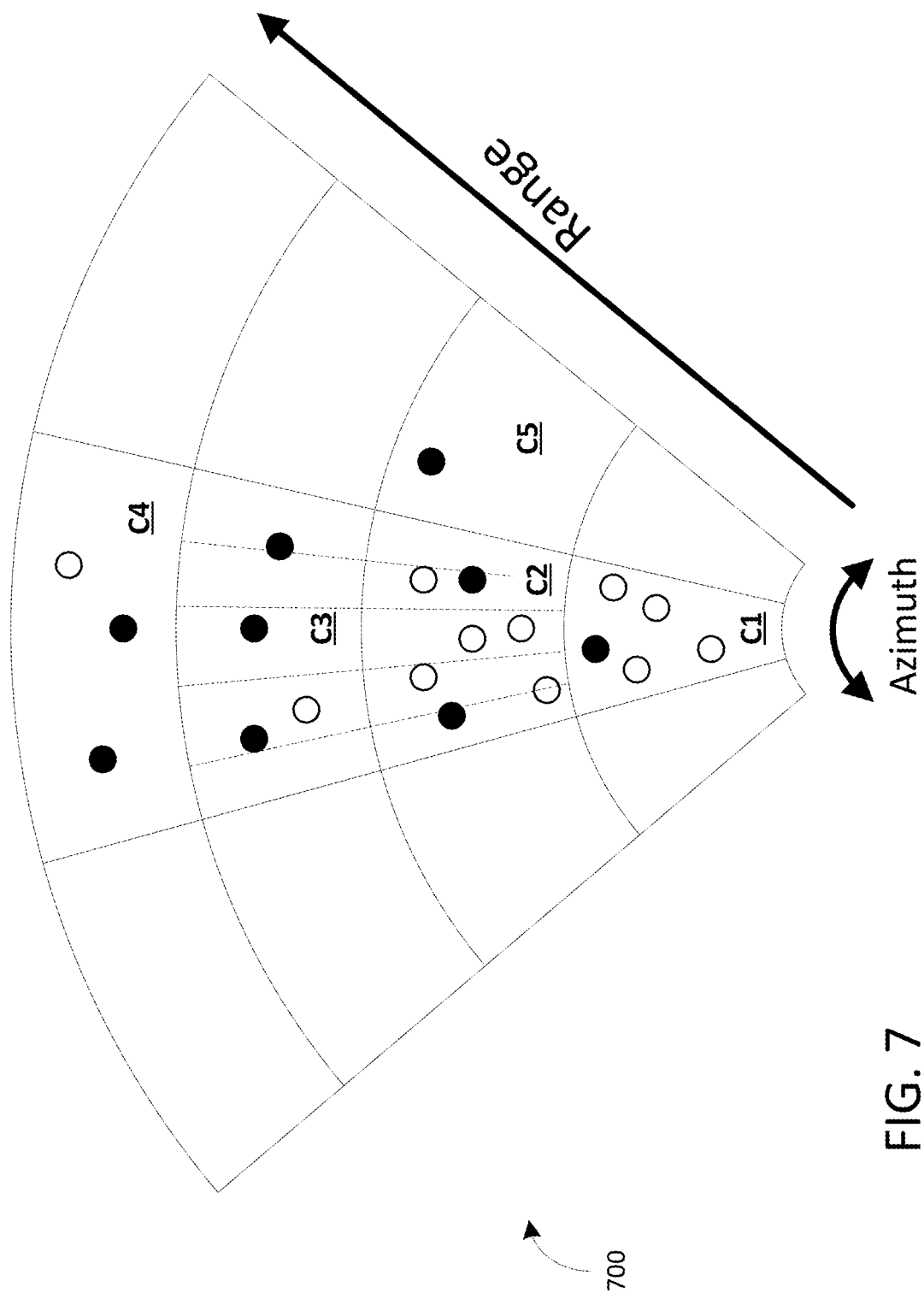
FIG. 7 is another diagram of a range-azimuth grid including a plurality of possible points to be included in the point cloud.

FIG. 7 is another diagram of a range-azimuth grid including a plurality of possible points to be included in the point cloud, as computed by the point cloud filtering module 140 according to embodiments of the present disclosure. The grid 700 shown in FIG. 7 is a non-linear range-azimuth grid. However, it will be appreciated that the present techniques can be applied to any suitable style of grid, including range-azimuth-elevation, X-Y, X-Y-Z, and others.

Each point in the grid is classified as a high confidence point (white) or a low confidence point (black), and may include information such as range, velocity, and others. FIG. 7 illustrates techniques for accepting or rejecting points based on adjacent cells. An adjacent cell is a cell that borders the cell in which the point of interest is located. In some embodiments, high confidence points may be accepted, while the low confidence points may be accepted or rejected based, at least in part, on the cell confidence scores of adjacent cells.

For example, if a cell of interest is laterally adjacent to a high confidence cell, then the low confidence points in the cell of interest may be accepted or the point confidence scores for those points may be adjusted upwards. A lateral cell in this case is a cell that covers the same range. For example, cell C5 is laterally adjacent to cell C2 and includes a single low confidence point. In this example, the low confidence point in cell C5 may be accepted since it is located in a cell adjacent to high confidence cell C2. Alternatively, rather than simply accepting the point, the confidence score for the point in C5 may be increased by a predetermined amount. If the adjustment is sufficient to push the point score above the threshold to be considered a high confidence point, then the point would then be accepted.

In some examples, points may be rejected or have their confidence scores reduced if they are located in cells that are shadowed i.e. they are in a shadow. A shadowed cell is a cell that is behind a high confidence cell, i.e., same azimuth but greater range. A cell's shadow can affect cells up to a specified range threshold. As shown in FIG. 7, cells C2 and C3 are both shadowed by cell C1. In this example, the length of the shadow of cell C1 is two cells, i.e., two cells behind cell C1 are considered to be shadowed. The length of a cell's shadow can be set to any suitable number and may be determined based at least in part on the height of the LIDAR system above ground. If a cell is shadowed, this may affect the acceptance or rejection of points in that cell depending in part on whether the cell is a high confidence cell or a low confidence cell. For example, the point confidence scores of points in shadowed cells may be reduced and/or low confidence points in shadowed cells may be rejected. The use of a shadow region helps avoid rejecting low confidence points that are in a low confidence cell but are not in a shadow and instead reject low confidence points that are in a shadow. Therefore, this technique specifically targets noise ghosting that occurs behind a moving object.

As shown in FIG. 7, cell C2 is shadowed by cell C1. However, cell C2 is a high confidence cell, therefore the points in cell C2 may not be affected in some embodiments. Cell C3 is a low confidence cell. Accordingly, the low confidence points in cell C3 may be rejected. Alternatively, all of the point confidence scores for the points in cell C3 may be reduced. Cell C4 is not in the shadow of cell C1. Accordingly, the points in cell C4 may not be affected.

In some embodiments, any cell that is not shadowed may be classified as a high confidence cell. In this case, low confidence points will be accepted if they do not fall in a shadow. This can help to reduce the instances in which true detections are filtered out of the point cloud. In the example shown in FIG. 7, this would cause the low confidence points in cells C4 and C5 to be accepted even though cells C4 and C5 are low confidence cells.

Figure 8:
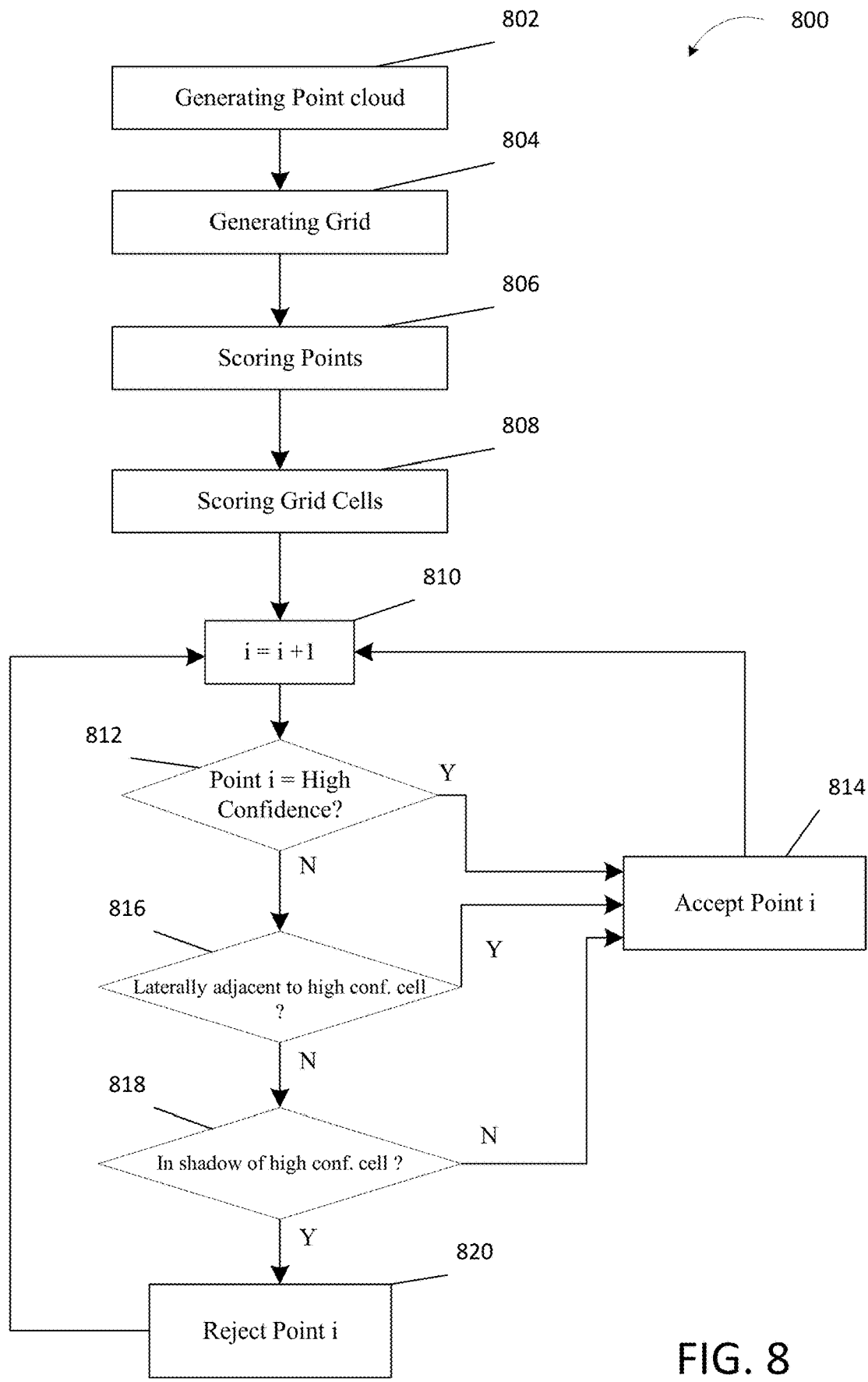
FIG. 8 is a process flow diagram of an example method of filtering a point cloud, according to an embodiment of the present disclosure.

FIG. 8 is a process flow diagram of an example method of filtering a point cloud as computed by the point cloud filtering module 140, according to an embodiment of the present disclosure. The method 800 may be performed by any suitable LIDAR system, including the LIDAR system 100 described above.

Blocks 802 through 810 may perform in substantially the same manner as blocks 602-610 of FIG. 6. At block 802, the point cloud is generated by the signal processing unit 112 (FIGS. 1 and 2). At block 804, the grid is computed by the grid computation module 122 (FIG. 2). At block 806, the points are scored by the score computation module 124 (FIG. 2). At block 808, the grid cells are scored by the score computation module 124 (FIG. 2). At block 810, a counter, i, is set to an initial value (e.g., 0 or 1). The points are then evaluated by the decision module 126 (FIG. 2) to determine whether to accept or reject each point.

At block 812, a determination is made regarding whether the point is a high confidence point. If the point is a high confidence point, the process flow advances to block 814 and the point is accepted. Otherwise, the process flow advances to block 816.

At block 816, a determination is made regarding whether the point is in a cell that is laterally adjacent to a high confidence cell. If so, the process flow advances to block 814 and the point is accepted. Otherwise, the process flow advances to block 818.

At block 818, a determination is made regarding whether the point is in a cell that is shadowed by a high confidence cell. If the point is not in a shadowed cell, then the process flow advances to block 814 and the point is accepted. Otherwise, the process flow advances to block 820 and the point is rejected. The process flow then returns to block 810, the counter is incremented, and the next point is processed.

It will be appreciated that embodiments of the method 800 may include additional blocks not shown in FIG. 8 and that some of the blocks shown in FIG. 8 may be omitted. Additionally, the processes associated with blocks 802 through 818 may be performed in a different order than what is shown in FIG. 8.

Figure 9:
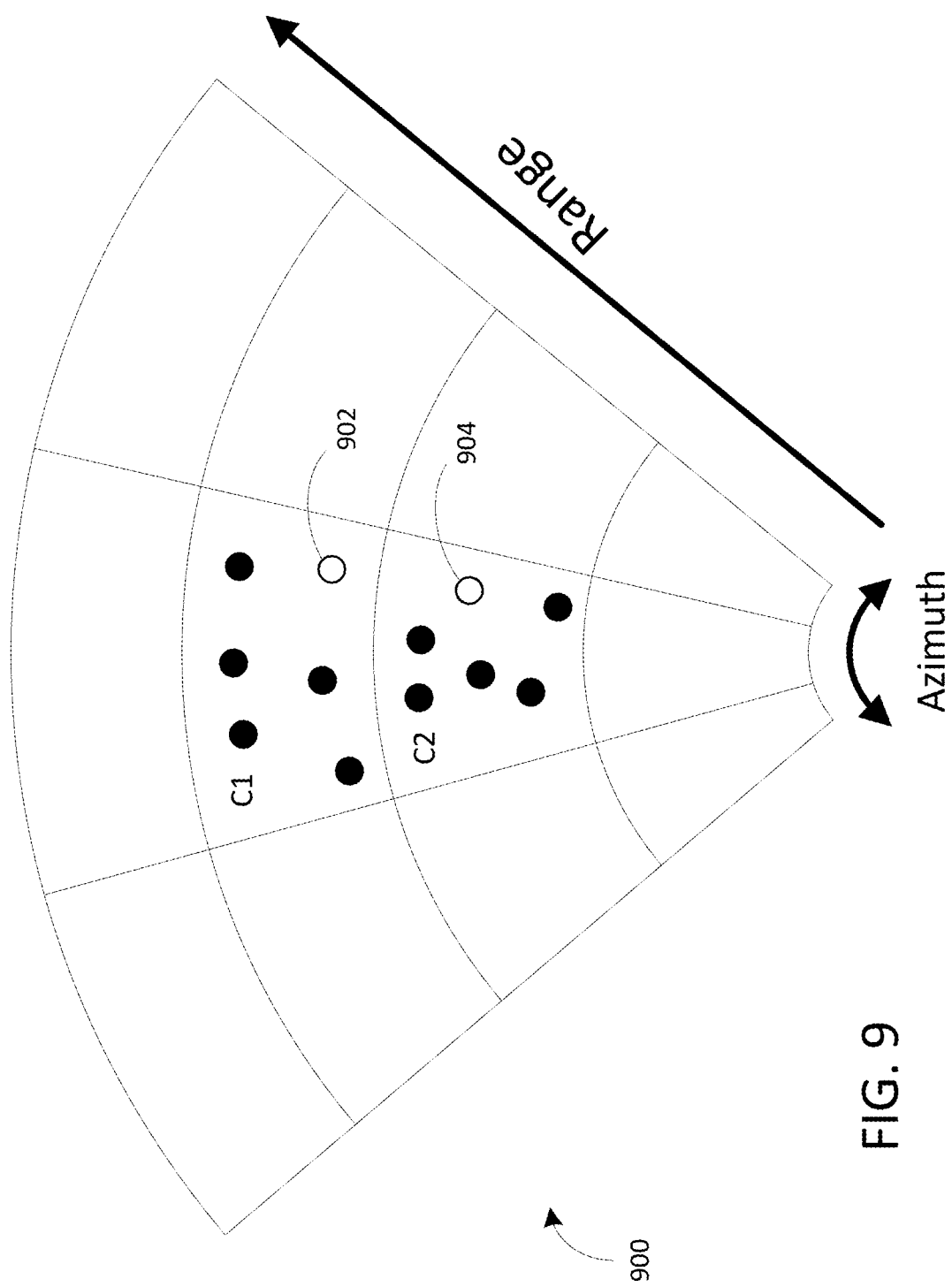
FIG. 9 is another diagram of a range-azimuth grid including a plurality of possible points to be included in the point cloud.

FIG. 9 is another diagram of a range-azimuth grid including a plurality of possible points to be included in the point cloud, as computed by XXX according to embodiments of the present disclosure. The grid 900 shown in FIG. 9 is a non-linear range-azimuth grid. However, it will be appreciated that the present techniques can be applied to any suitable style of grid, including range-azimuth-elevation, X-Y, X-Y-Z, and others. Additionally, it will be appreciated that in most cases there may be several points in each of the cells. However, for the convenience of the present description only cells C1 and C2 are shown as populated.

The techniques described herein can be used to resolve dual target points. As described above, dual target points may sometimes be generated to account for the possibility of negative frequency aliasing. Negative frequency aliasing may be more prevalent in situations where the target is close in range and is traveling at a high velocity, relative to the sensor. Accordingly, in some embodiments, range and/or velocity thresholds may be specified, and those points that fall within the threshold may be identified for dual target filtering. In other embodiments, dual target filtering may be applied for all the points.

If dual target filtering is to be applied to a point, two points are generated for the detected frequency peaks. From equations 5 and 6 above, the detected frequency peaks $f_{up}$ and $f_{dn}$ would result in the two following potential points:

$$R_1 = \alpha \cdot (f_{up} + f_{dn}), V_1 = \beta \cdot (f_{up} - f_{dn})$$

$$R_2 = \alpha \cdot (f_{up} - f_{dn}), V_2 = \beta \cdot (f_{up} + f_{dn})$$

In the grid 900, point 1 ($R_1$, $V_1$) is shown as point 902 and is located in cell C1, and point 2 ($R_2$, $V_2$) is shown as point 904 and is located in cell C2. The azimuth and elevation will be the same for both points. In a dual target scenario, only one of these points is a true detection—the other is a false detection.

To determine which point represents the true target, the point velocity of each point may be compared to the average cell velocity of the cell in which it is located. If the point velocity is close to the velocity of its corresponding cell within a specified threshold, then that point is accepted and the other point is rejected. The following table describes examples of filtering decisions that may be made based on the comparison of the point velocity and average cell velocity.

TABLE 1

Dual Point Filtering Examples.

|  |  | Point Vel. | Avg. Cell Vel. | Cell Conf. Score | Decision |
|---|---|---|---|---|---|
| Example 1 | C1 | 9 | 10 | 70 | Accept |
|  | C2 | −15 | −8 | 60 | Reject |
| Example 2 | C1 | 18 | 10 | 70 | Reject |
|  | C2 | 9 | −8 | 60 | Accept |
| Example 3 | C1 | 18 | 10 | 70 | Reject |
|  | C2 | −14 | −8 | 60 | Reject |

In example 1, the point in cell C1 is accepted because the point velocity is a close match for the avg cell velocity. In example 2, the point in cell C2 is accepted because the point velocity is a close match for the avg cell velocity, even though the cell confidence score for the cell is lower. In example 3, both points are rejected because neither of the point velocities is a close match for the avg cell velocity of the corresponding cell.

Figure 10:
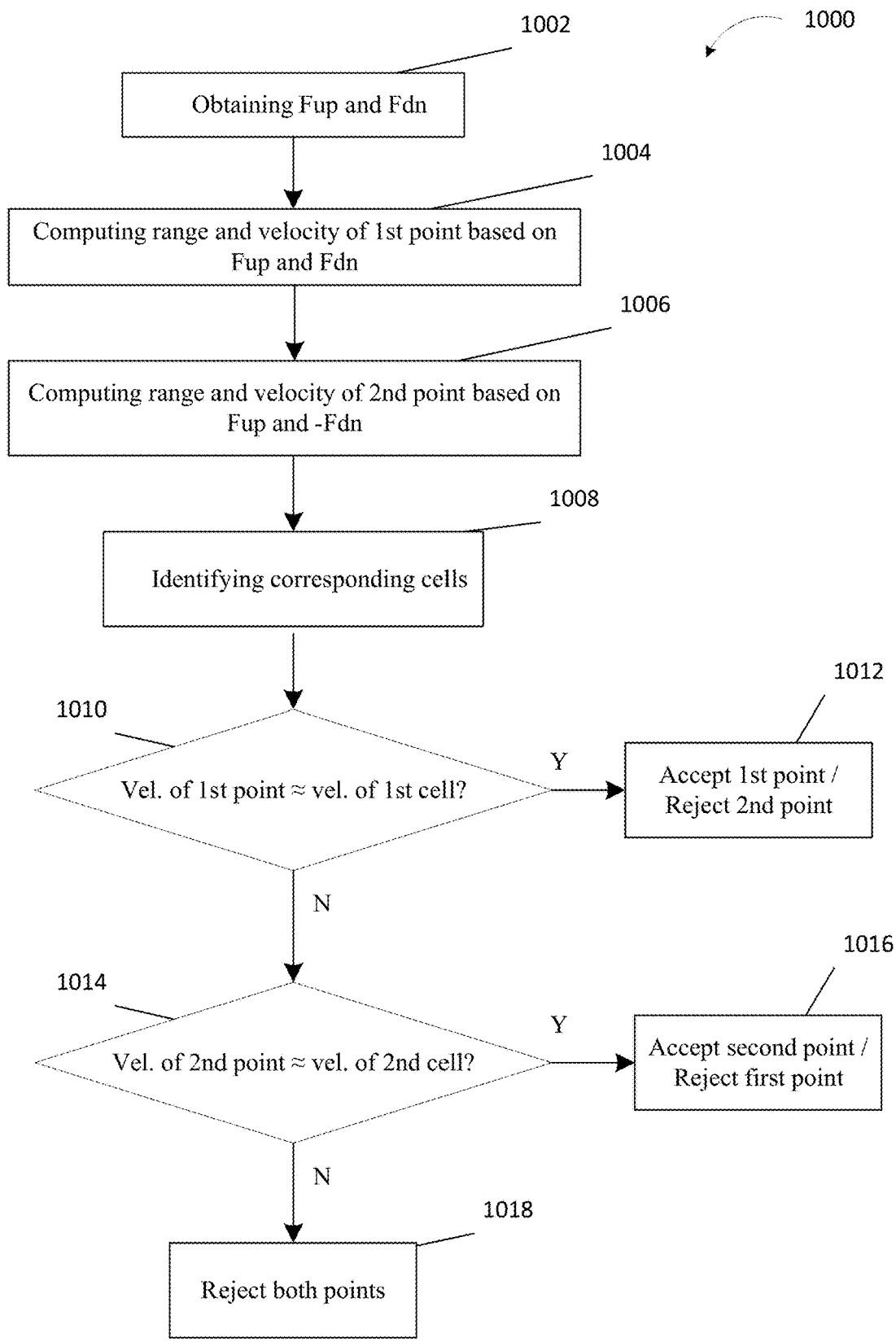
FIG. 10 is a process flow diagram of an example method of dual point filtering, according to an embodiment of the present disclosure.

FIG. 10 is a process flow diagram of an example method of dual point filtering, as computed by the point cloud filtering module 140 according to an embodiment of the present disclosure. The method 1000 may be performed by any suitable LIDAR system, including the LIDAR system 100 described above, and more specifically by the signal processing unit 112. The method may begin at block 1002.

At block 1002, the up-sweep frequency peak, $f_{up}$, and the down-sweep frequency peak, $f_{dn}$, are obtained by the peak search processor 312 (FIG. 3). These frequency peaks correspond to a single potential point. The azimuth and the elevation of the potential point may be obtained based on the orientation of the scanning circuitry when the sample frequencies are obtained.

At block 1004, the range and velocity are computed for a first point using $f_{up}$ and $f_{dn}$. Block 1004 may be performed by the point cloud filtering module 140, for example.

At block 1006, the range and velocity are computed for a second point using $f_{up}$ and $-f_{dn}$. Block 1006 may be performed by the point cloud filtering module 140, for example.

At block 1008, the point information is used to identify a cell for each point. In this example, the first point is located in a first cell and the second point is located in a second cell. Each cell may be associated with an average cell velocity that was computed based on other points within the cell. Block 1008 may be performed by the point cloud filtering module 140, for example.

At block 1010, the velocity of the first point is compared to the average velocity of the first cell. This may be performed by the decision module 126, for example. If the point velocity is within a specified threshold of the average cell velocity, the velocities are determined to be a match, and the process flow advances to block 1012. At block 1012, the first point is accepted and the second point is rejected. If the velocities do not match then the process flow advances to block 1014.

At block 1014, the velocity of the second point is compared to the average velocity of the second cell. This may be performed by the decision module 126, for example. If the point velocity is within a specified threshold of the cell velocity, the velocities are determined to be a match, and the process flow advances to block 1016. At block 1016, the second point is accepted and the first point is rejected. If the velocities do not match then the process flow advances to block 1018.

At block 1018, both points are rejected since the velocities did not match for either point, indicating that the point is likely to be the result of noise. The process described herein may be repeated for each point to be added to the point cloud or a subset of points, for example, points within a threshold range and/or velocity.

It will be appreciated that embodiments of the method 1000 may include additional blocks not shown in FIG. 10 and that some of the blocks shown in FIG. 10 may be omitted. Additionally, the processes associated with blocks 1002 through 1018 may be performed in a different order than what is shown in FIG. 10.

Figure 11:
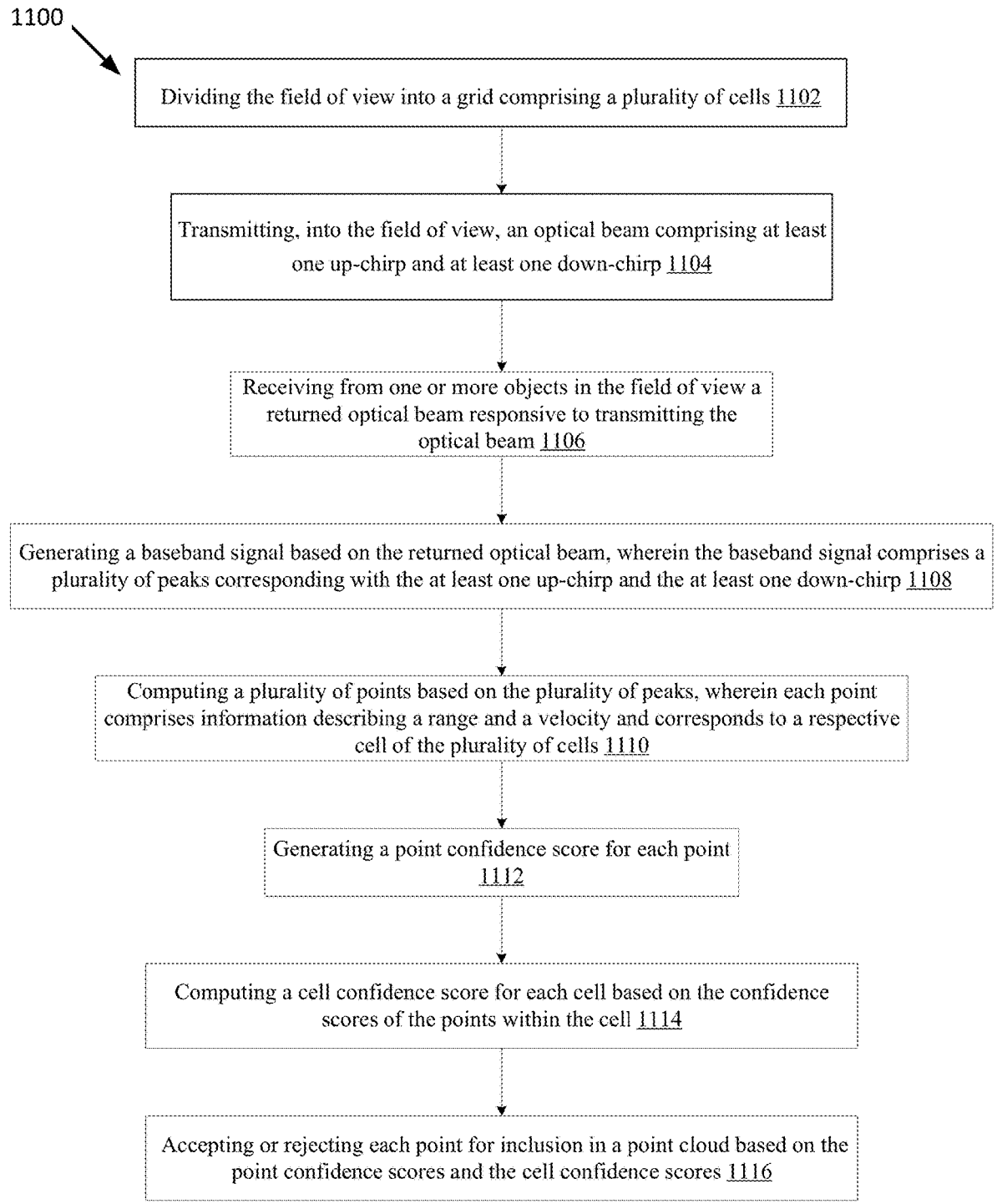
FIG. 11 is a process flow diagram summarizing an example method of point cloud filtering, according to an embodiment of the present disclosure.

FIG. 11 is a process flow diagram summarizing an example method of point cloud filtering, according to an embodiment of the present disclosure. The method 1100 may be performed by any suitable LIDAR system, including the LIDAR system 100 described above. The method may begin at block 1102.

At block 1102, the field of view of the LIDAR system is divided into a grid including a plurality of cells.

At block 1104, an optical beam is transmitted into the field of view of the LIDAR system. The optical beam can include one or more up-chirps and one or more corresponding down-chirps.

At block 1106, a returned optical beam is received from one or more objects in the field of view responsive to transmitting the optical beam. For example, the transmitted beam may be scattered or reflected from a target such that a portion of the energy of the transmitted beam forms the return beam.

At block 1108, a baseband signal is generated based on the returned optical beam. The baseband signal includes a plurality of peaks corresponding with the up-chirp and the down-chirp. For example, the plurality of peaks may include a single up sweep peak for each up chirp transmitted, and one or more down sweep peaks for each down chirp.

At block 1110, a plurality of points are computed based on the plurality of peaks. Each point includes information describing a range and a velocity and corresponds to a respective cell of the plurality of cells. Each point may also include additional information such as signal intensity and others.

At block 1112, a point confidence score is generated for each point. The point confidence scores may be computed based on the signal intensity and other information about the point as described above.

At block 1114, a cell confidence score is computed for each cell. The cell confidence scores may be based on the confidence scores of the points within the cell. For example, the point confidence scores of the points within a cell may be averaged to determine the cell confidence score for the cell.

At block 1116, each point may be accepted or rejected for inclusion in a point cloud based on the point confidence scores and the cell confidence scores. The filtering technique used to accept or reject the points may be any of the filtering techniques described herein or combinations thereof.

It will be appreciated that embodiments of the method 1100 may include additional blocks not shown in FIG. 11 and that some of the blocks shown in FIG. 11 may be omitted. Additionally, the processes associated with blocks 1102 through 1116 may be performed in a different order than what is shown in FIG. 11.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operations may be performed, at least in part, concurrently with other operations. Instructions or sub-operations of distinct operations may be performed in an intermittent or alternating manner.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A method of filtering points for a point cloud in a frequency modulated continuous wave (FMCW) light detection and ranging (LIDAR) system, the method comprising:
   transmitting, into a field of view (FOV) of a FMCW LIDAR system, an optical beam comprising at least one up-chirp and at least one down-chirp;
   computing, in memory resident in the FMCW LIDAR system, based on the FOV, a grid comprising a plurality of cells;
   receiving, from one or more objects in the FOV, a return optical beam based on the optical beam;
   generating a baseband signal based on the return optical beam, wherein the baseband signal comprises a plurality of peaks corresponding with the at least one up-chirp and the at least one down-chirp;
   computing a plurality of points based on the plurality of peaks, wherein each point comprises a range information and a velocity information that corresponds to a respective cell of the plurality of cells; and
   for each point of the plurality of points, computing a point confidence score to produce a plurality of point confidence scores;
   for each cell of the plurality of cells, computing a cell confidence score based on the plurality of point confidence scores; and
   for each point of the plurality of points, accepting or rejecting the point for inclusion in a point cloud based on comparing the point confidence score with a first threshold and comparing the cell confidence score with a second threshold.

2. The method of claim 1, comprising:
   for each point, classifying the point as a high confidence point or a low confidence point based on comparing the point confidence score for the point with the first threshold; and
   for each cell, classifying the cell as a high confidence cell or a low confidence cell based on comparing the cell confidence score for the cell with the second threshold.

3. The method of claim 2, comprising, for each low confidence point:
   accepting the low confidence point if the low confidence point is in one of the high confidence cells; and
   rejecting the low confidence point if the low confidence point is in one of the low confidence cells.

4. The method of claim 2, comprising, for each cell, computing an average cell velocity for the cell by averaging the velocities of the points within the cell, and for each low confidence point:
   accepting the low confidence point if the low confidence point is in one of the high confidence cells and the velocity of the low confidence point is within a threshold range of the average cell velocity of the cell; and
   rejecting the low confidence point if the low confidence point is in one of the low confidence cells or the velocity of the low confidence point is outside of a threshold range of the average cell velocity of the cell.

5. The method of claim 1, comprising:
   for each point, accepting or rejecting the point based on the point confidence score of the point and the cell confidence score of an adjacent cell that is adjacent to a cell in which the point is located.

6. The method of claim 1, wherein the point confidence score for each point is based on an intensity of the returned optical beam corresponding to the point.

7. The method of claim 1, comprising, for a first peak representing an up-chirp of the at least one up-chirp, and a second peak representing a corresponding down-chirp of the at least one down-chirp:
- generating a negative image of the second peak to generate a third peak;
- computing, using the first peak and the second peak, a first point of the plurality of points, the first point having a first velocity and a first location within a first cell;
- computing, using the first peak and the third peak, a second point of the plurality of points, the second point having a second velocity and a second location within a second cell;
- determining whether to reject the first point by comparing the first velocity with an average velocity of the first cell; and
- determining whether to reject the second point by comparing the second velocity with an average velocity of the second cell.

8. The method of claim 1, wherein dividing the field of view into the grid comprises generating the grid as a non-linear K-dimensional tree (KDTree).

9. The method of claim 1, wherein the optical beam is a frequency-modulated continuous wave (FMCW) optical beam.

10. A frequency modulated continuous wave (FMCW) light detection and ranging (LIDAR) system, comprising:
- an optical scanner to transmit, into a field of view, an optical beam comprising at least one up-chirp and at least one down-chirp, and receive from one or more objects in the field of view a returned optical beam responsive to the transmission of the optical beam;
- an optical processing system coupled to the optical scanner to generate a baseband signal from the returned optical beam, wherein the baseband signal comprises a plurality of peaks corresponding with the at least one up-chirp and the at least one down-chirp; and
- a signal processing system coupled to the optical processing system and configured to:
  - divide the field of view into a grid comprising a plurality of cells;
  - compute a plurality of points based on the plurality of peaks, wherein each point comprises information that describes a range and a velocity and corresponds to a respective cell of the plurality of cells;
  - for each point of the plurality of points, generate a point confidence score for the point;
  - for each cell of the plurality of cells, compute a cell confidence score for the cell based on the point confidence scores of the points within the cell; and
  - for each point, accept or reject the point for inclusion in a point cloud based on comparing the point confidence score for the point with a first threshold and comparing the cell confidence scores for the plurality of cells with a second threshold.

11. The FMCW LIDAR system of claim 10, wherein the signal processing system is to:
- for each point, classify the point as a high confidence point or a low confidence point based on a comparison of the point confidence score for the point with the first threshold; and
- for each cell, classify the cell as a high confidence cell or a low confidence cell based on a comparison of the cell confidence score for the cell with the second threshold.

12. The FMCW LIDAR system of claim 11, wherein the signal processing system is to, for each low confidence point:
- accept the low confidence point if the low confidence point is in one of the high confidence cells; and
- reject the low confidence point if the low confidence point is in one of the low confidence cells.

13. The FMCW LIDAR system of claim 11, wherein the signal processing system is to compute, for each cell, an average cell velocity for the cell by computing an average velocity of the points within the cell, and for each low confidence point:
- accept the low confidence point if the low confidence point is in one of the high confidence cells and the velocity of the low confidence point is within a threshold range of the average cell velocity of the cell; and
- reject the low confidence point if the low confidence point is in one of the low confidence cells or the velocity of the low confidence point is outside of a threshold range of the average cell velocity of the cell.

14. The FMCW LIDAR system of claim 10, wherein the signal processing system is to:
- for each point, accept or reject the point based on the point confidence score of the point and the cell confidence score of an adjacent cell that is adjacent to a cell in which the point is located.

15. The FMCW LIDAR system of claim 10, wherein the signal processing system is to, for a first peak representing an up-chirp of the at least one up-chirp, and a second peak representing a corresponding down-chirp of the at least one down-chirp:
- generate a negative image of the second peak to generate a third peak;
- compute, based on the first peak and the second peak, a first point of the plurality of points, the first point having a first velocity and a first location within a first cell;
- compute, based on the first peak and the third peak, a second point of the plurality of points, the second point having a second velocity and a second location within a second cell;
- determine whether to reject the first point by a comparison of the first velocity with an average velocity of the first cell; and
- determine whether to reject the second point by a comparison of the second velocity with an average velocity of the second cell.

16. The FMCW LIDAR system of claim 10, wherein the optical beam is a frequency-modulated continuous wave (FMCW) optical beam.

17. A frequency modulated continuous wave (FMCW) light detection and ranging (LIDAR) system, comprising:
- a processing device; and
- a memory to store instructions that, when executed by the processing device, cause the LIDAR system to:
  - receive a baseband signal wherein the baseband signal comprises a plurality of peaks corresponding with at least one up-chirp and at least one down-chirp of a returned optical beam;
  - divide a field of view of the LIDAR system into a grid comprising a plurality of cells;
  - compute a plurality of points based on the plurality of peaks, wherein each point comprises information that describes a range and a velocity and corresponds to a respective cell of the plurality of cells;
  - for each point of the plurality of points, compute a point confidence score for the point;

for each cell of the plurality of cells, compute a cell confidence score for the cell based on the point confidence scores of the points within the cell; and for each point, accept or reject the point for inclusion in a point cloud based on comparing the point confidence score for the point with a first threshold and comparing the cell confidence scores for the plurality of cells with a second threshold.

18. The FMCW LIDAR system of claim 17, wherein the instructions cause the LIDAR system to:

for each point, classify the point as a high confidence point or a low confidence point based on a comparison of the point confidence score for the point with the first threshold;

for each cell, classify the cell as a high confidence cell or a low confidence cell based on a comparison of the cell confidence score for the cell with the second threshold; and for each low confidence point, accept the low confidence point if the low confidence point is in one of the high confidence cells, or reject the low confidence point if the low confidence point is in one of the low confidence cells.

19. The FMCW LIDAR system of claim 17, wherein the instructions cause the LIDAR system to:

for each point, accept or reject the point based on the point confidence score of the point and the cell confidence score of an adjacent cell that is adjacent to a cell in which the point is located.

20. The FMCW LIDAR system of claim 17, wherein the instructions cause the LIDAR system to, for a first peak representing an up-chirp of the at least one up-chirp, and a second peak representing a corresponding down-chirp of the at least one down-chirp:

generate a negative image of the second peak to generate a third peak;

compute, based on the first peak and the second peak, a first point with a first velocity and a first location within a first cell;

compute, based on the first peak and the third peak, a second point with a second velocity and a second location within a second cell;

determine whether to reject the first point by comparing the first velocity with an average velocity of the first cell; and determine whether to reject the second point by comparing the second velocity with an average velocity of the second cell.

\* \* \* \* \*